Oct. 27, 1925.

B. L. LIGON
WELL FISHING TOOL
Filed Feb. 1, 1924

INVENTOR
Berh L. Ligon

Oct. 27, 1925.
B. L. LIGON
WELL FISHING TOOL
Filed Feb. 1, 1924
1,558,902
2 Sheets-Sheet 2
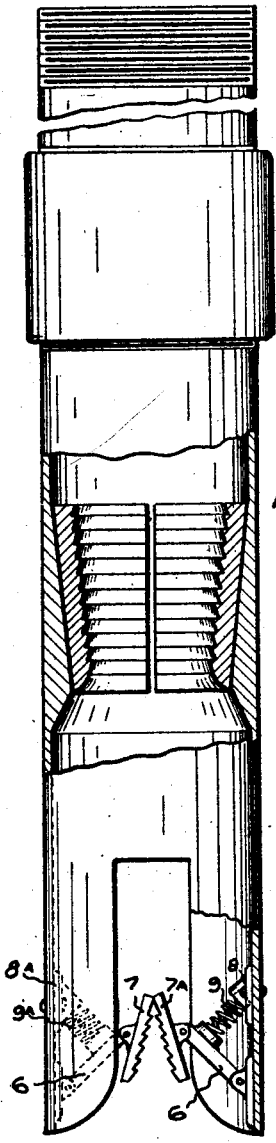
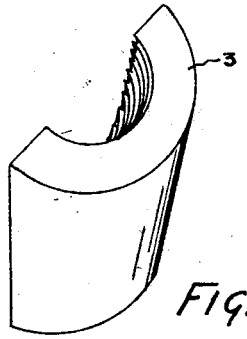
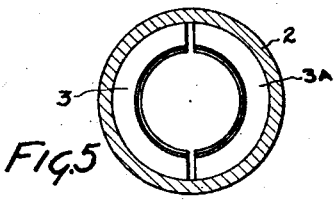
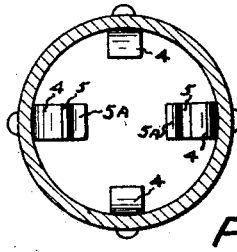
INVENTOR
Bert L. Ligon Patented Oct. 27, 1925.

1,558,902

UNITED STATES PATENT OFFICE.

BERT L. LIGON, OF ELECTRA, TEXAS.

WELL FISHING TOOL.

Application filed February 1, 1924. Serial No. 689,913.

*To all whom it may concern:*

Be it known that I, BERT L. LIGON, a citizen of the United States, residing at Electra, in the county of Wichita and State of Texas, have invented new and useful Improvements in a Well Fishing Tool; and I do declare the following to be a full, clear, and exact description of the invention, such as will enable others skilled in the art to which it appertains to make and use the same.

The invention relates to a fishing tool for the purpose of recovering various objects that may be accidentally dropped in a well, and it is my principal object to provide a device of this nature that will pick up and remove objects of various shapes and sizes. A further object of the invention is to provide a fishing tool that will straighten objects that are crosswise in a well and pick them up.

Yet another object is to provide a fishing tool that will automatically attach to tubular objects and remove them from a well.

With the foregoing in view, the invention resides in the novel subject matter hereinafter described and claimed, the description being supplemented by the accompanying drawing, wherein, Figure 1 is a partly sectioned view showing the transverse slot.

Figure 3 illustrates the same principle showing spring slips of a different design.

Figure 4 is a view at line B to B of Figure 1.

Figure 5 is a view at line A to A in Figure 1.

Figure 6 is a perspective view of one of the tapered slips.

Figure 7 is a perspective view of one of the notched gripping members, as shown in Figure 3.

Figure 8 is a perspective view of one of the spring slip members, as shown in Figure 1.

Figure 1:
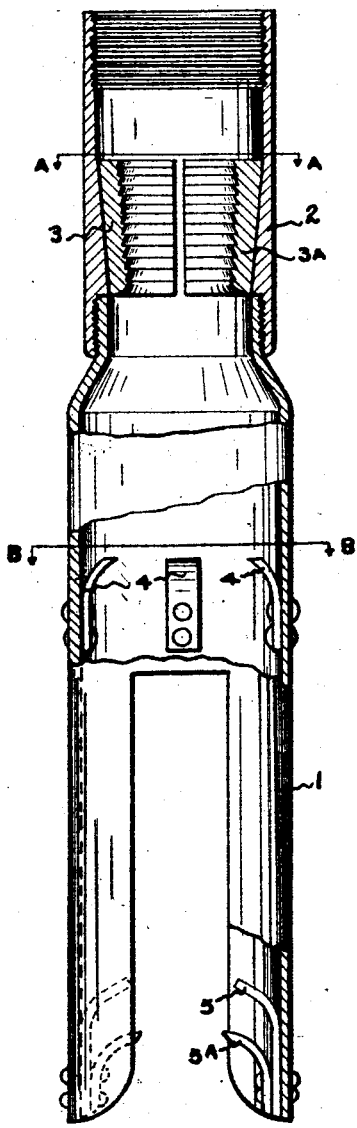
Figure 2:
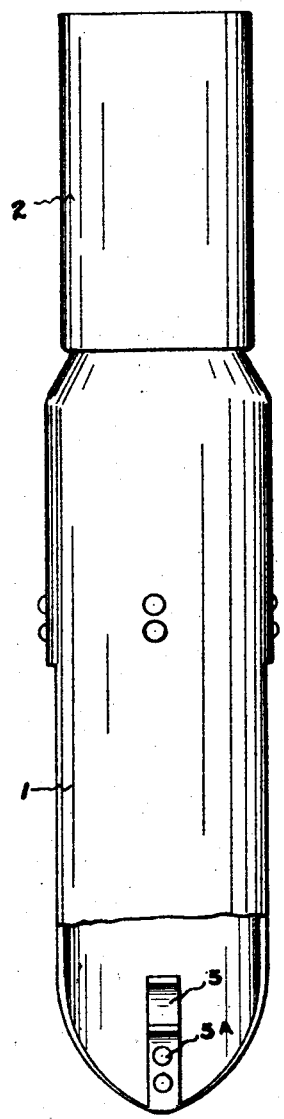
Figure 2 is a side view of Figure 1 partly sectioned to show one pair of the lower spring slips.

With reference to the accompanying drawing, 1 designates a tubular member having a transverse slot in the lower portion thereof, the opening of said slot being rounded to the edges of the said tubular member, the diameter of the upper portion of the tubular member is reduced and threaded as shown in Figure 1. 2 is a tubular member threaded over the reduced portion of the tubular member 1, the tubular member 2 being internally threaded at the top thereof for the purpose of attaching pipe or drill stem, which extends to the surface of a well. The tubular member 2 is tapered internally intermediate its ends and provided with a pair of internally notched and exteriorly tapered slips, as shown at 3 and 3$^a$ and more clearly illustrated in Figure 6. 4 are spring slips attached to the inside of the tubular member 1 above the aforementioned slot, as shown, one of the spring slips being clearly illustrated in Figure 8. 5 and 5$^a$ are spring slips similar to the spring slips 4. The spring slips 5 and 5$^a$ are attached in pairs as shown to the lower end of the tubular member 1 on each side of the aforementioned slot in opposite relation.

To render the record more complete, I have illustrated a modified design of the fishing tool involving the same principle in Figure 3, wherein the tapered slips are disposed in the lower slotted tubular member and the upper spring slips omitted. Figure 3 also illustrates a type of spring operated slips which may be substituted as the equivalent of the spring slips 4, 5 and 5$^a$. The spring operated slips comprise arms 6 pivoted to the inside of the tubular member at the lower end thereof disposed oppositely on each side of the slot, as shown. 7 and 7$^a$ are a pair of notched gripping members pivoted to the arms 6. 8 and 8$^a$ are spring sockets attached to the sides of the tubular member, 9 and 9$^a$ are coil springs extending between the spring sockets 8 and 8$^a$ and the spring sockets on the arms 6. Figure 3 illustrates the normal position of the gripping members 7 and 7$^a$. It will be noted that when the gripping members are lowered over an object, the springs 9 and 9$^a$ will allow the said gripping members to open and the object to project therebetween, as the gripping members are raised the weight of the object being removed will cause the said gripping members to hold firmly. The tapered slips illustrated in Figure 3 operate the same as in Figure 1, which is hereinafter explained. With reference to Figure 1 the slot is for the purpose of providing lips on the lower end of the tool to straighten objects in the hole by rotating the said tool. When the tool is being lowered over an object the spring slips 5 and 5ᵃ will spring open and allow the object to project therebetween. When the tool is being raised the weight of the object being removed will cause the spring slips to grip firmly. The spring slips 4 operate in the same manner as the slips 5 and 5ᵃ. The tapered slips 3 and 3ᵃ are for the purpose of removing tubular objects. When the tool is lowered over a tubular object, the spring slips will spring open and the tubular object will raise the tapered slips, thus enlarging the inside diameter between the two halves of the tapered slips 3 and 3ᵃ and allowing the tubular object which is being removed to project therebetween, however, it will be noted that the notched teeth of the tapered slips are at all times in contact with the tubular object being removed, and as the tool is being raised the object being removed will have a tendency to pull the slips downward in the tapered portion of the tubular member 2. thus gripping the object firmly. It will also be noted that in this tool is provided an open waterway to the bottom thereof, whereby circulation of water may be maintained for the purpose of washing the side walls of a hole where an object is crossed therein or to release an object where the side walls have caved in on the same.

The foregoing description is believed to clearly disclose the nature and advantages of the invention, as well as the operation thereof, however, I wish to indicate clearly in the record that I do not limit myself to the specific construction herein shown and described, and that such changes may be resorted to, when desired, as fall within the scope of what is herein claimed.

What I claim is:

A well fishing tool comprising in combination a tubular casing having a transverse slot communicating with its lower opened end, a pair of arms, means for pivotally connecting the lower end of each to the inner wall and adjacent the lower end of said casing, notched gripping members normally projecting within the slot of the casing, means for pivotally connecting the medial portion of said gripping members to the upper ends of said arms, sockets carried by said arms and inner walls of said tubular casing, and coil springs arranged in said sockets for normally forcing said gripping members towards one another.

BERT L. LIGON.